(12) United States Patent
Caporali et al.

(10) Patent No.: US 11,105,244 B2
(45) Date of Patent: Aug. 31, 2021

(54) EXHAUST GAS TREATMENT DEVICE COMPRISING AN ELECTROCHEMICAL CELL

(71) Applicant: Ford Global Technologies, LLC, Dearborn, MI (US)

(72) Inventors: Roberto Caporali, Chelmsford (GB); Peter Eastwood, Sheffield (GB); Anthony Birri, Southgate (GB)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 16/262,742

(22) Filed: Jan. 30, 2019

(65) Prior Publication Data
US 2019/0242287 A1   Aug. 8, 2019

(30) Foreign Application Priority Data
Feb. 7, 2018   (GB) ...................... 1801983

(51) Int. Cl.
*F01N 9/00*   (2006.01)
*B01D 53/94*   (2006.01)
(Continued)

(52) U.S. Cl.
CPC ........... *F01N 9/00* (2013.01); *B01D 46/0027* (2013.01); *B01D 53/326* (2013.01);
(Continued)

(58) Field of Classification Search
CPC ........ F01N 9/00; F01N 13/009; F01N 3/2066; F01N 3/035; F01N 3/0814; F01N 3/0842;
(Continued)

(56) References Cited

U.S. PATENT DOCUMENTS

| 6,696,031 B1 | 2/2004 | Twigg et al. |
| 2006/0179825 A1 | 8/2006 | Hu et al. |

(Continued)

FOREIGN PATENT DOCUMENTS

| DE | 102010028146 A1 | 10/2011 |
| EP | 2067948 A1 | 6/2009 |

(Continued)

OTHER PUBLICATIONS

Great Britain Intellectual Property Office, Combined Search and Examination Report under Sections 17 and 18(3) Issued in Application No. GB1801983.6, dated Aug. 1, 2018, 9 pages.

*Primary Examiner* — Brandon D Lee
(74) *Attorney, Agent, or Firm* — Geoffrey Brumbaugh; McCoy Russell LLP

(57) ABSTRACT

Methods and systems are provided for an exhaust gas treatment device. In one example, the exhaust gas treatment device comprises an electrochemical cell having a first electrode, a second electrode and an electrolyte provided between the first and second electrodes, wherein the electrochemical cell is configured to convert a first pollutant species, such as nitric oxide, within the exhaust gas to a second pollutant species, such as nitrogen dioxide, such that a concentration of the second pollutant species within the exhaust gases leaving the exhaust gas treatment device is increased relative to the exhaust gases entering the exhaust gas treatment device.

20 Claims, 8 Drawing Sheets

(51) Int. Cl.
*F01N 13/00* (2010.01)
*F01N 3/20* (2006.01)
*B01D 46/00* (2006.01)
*B01D 53/32* (2006.01)
*F01N 3/035* (2006.01)
*F01N 3/08* (2006.01)
*F01N 3/10* (2006.01)

(52) U.S. Cl.
CPC ..... *B01D 53/9409* (2013.01); *B01D 53/9431* (2013.01); *B01D 53/9477* (2013.01); *B01D 53/9495* (2013.01); *F01N 3/035* (2013.01); *F01N 3/0814* (2013.01); *F01N 3/0842* (2013.01); *F01N 3/0892* (2013.01); *F01N 3/106* (2013.01); *F01N 3/208* (2013.01); *F01N 3/2066* (2013.01); *F01N 13/009* (2014.06); *B01D 2251/10* (2013.01); *B01D 2279/30* (2013.01); *F01N 2240/04* (2013.01); *F01N 2900/1402* (2013.01); *F01N 2900/1616* (2013.01)

(58) Field of Classification Search
CPC ........ F01N 3/0892; F01N 3/106; F01N 3/208; F01N 2240/04; F01N 2900/1402; F01N 2900/1616; F01N 3/103; F01N 2240/32; F01N 2240/34; F01N 2570/14; B01D 53/9409; B01D 53/9477; B01D 46/0027; B01D 53/326; B01D 53/9431; B01D 53/9495; B01D 2251/10; B01D 2279/30; B01D 2257/404; B01D 2258/01; B01D 53/925; Y02T 10/40; Y02T 10/12
See application file for complete search history.

(56) References Cited

U.S. PATENT DOCUMENTS

| | | |
|---|---|---|
| 2008/0202096 A1 | 8/2008 | Driscoll et al. |
| 2008/0271441 A1 | 11/2008 | Nagata et al. |
| 2010/0326054 A1 | 12/2010 | Kato |
| 2013/0136676 A1 | 5/2013 | Princivalle et al. |
| 2014/0157761 A1* | 6/2014 | Hodgson .................. F01N 9/00 60/274 |
| 2014/0373509 A1 | 12/2014 | Englert et al. |
| 2016/0175768 A1 | 6/2016 | Hansen et al. |

FOREIGN PATENT DOCUMENTS

| | | |
|---|---|---|
| JP | S5744719 A | 3/1982 |
| JP | H0692616 A | 4/1994 |

* cited by examiner

EXHAUST GAS TREATMENT DEVICE COMPRISING AN ELECTROCHEMICAL CELL

CROSS REFERENCE TO RELATED APPLICATION

The present application claims priority to Great Britain Patent Application No. 1801983.6, filed on Feb. 7, 2018. The entire contents of the above-listed application are hereby incorporated by reference for all purposes.

FIELD

The present description relates generally to a first exhaust gas treatment device improving performance of a second exhaust gas treatment device.

BACKGROUND/SUMMARY

The exhaust system of a modern motor vehicle may comprise a plurality of exhaust gas treatment devices, each configured to reduce the concentration of one or more pollutant species within the exhaust gases before they are emitted from the vehicle exhaust system.

The exhaust gas treatment devices may comprise a catalyst, such as a platinum group metal catalyst, a metal oxide catalyst, a zeolite catalyst, or other desirable catalyst depending on the pollutant species to be reacted. The catalyst may increase a rate of a chemical reaction by which one or more pollutant species are oxidized, reduced, and/or captured within the exhaust treatment device.

The performance of a particular exhaust gas treatment device, (e.g. the rate of the chemical reaction occurring within the exhaust gas treatment device), may depend on one or more of the type of catalyst provided within the exhaust gas treatment device, the surface area of the catalyst exposed to the exhaust gases, and the properties of the exhaust gases passing though the exhaust gas treatment device, such as their temperature.

Furthermore, the rate of the chemical reaction occurring within each exhaust gas treatment device may depend on the concentration of a particular pollutant species within the exhaust gases. The concentration of the pollutant species may vary according to the operating conditions of an engine of the motor vehicle. Additionally, the concentration of the particular pollutant species may depend on the operation of the exhaust gas treatment devices arranged upstream of the particular exhaust gas treatment device.

Because the catalyst is selected and applied to a substrate within the exhaust gas treatment device during manufacture, the performance of the exhaust gas treatment device may not be adjusted independently of the operation of the engine during operation of the motor vehicle (e.g. to ensure that the exhaust gas treatment device and any other exhaust gas treatment devices arranged downstream of the exhaust gas treatment device are operating efficiently).

Furthermore, because the performance of the exhaust gas treatment device depends on the availability of the catalyst to catalyze the chemical reaction, it may be difficult to diagnose a fault with a particular exhaust gas treatment device or to identify when it is not operating effectively.

In one example, the issues described above may be addressed by an exhaust system comprising an exhaust passage comprising a first exhaust gas treatment device upstream of a first emission control device, further comprising a second exhaust gas treatment device downstream of the first emission control device and upstream of a second emission control device, and where the first and second exhaust gas treatment devices are configured to increase a concentration of $NO_2$. In this way, $NO_2$ concentrations may be selectively increased by the exhaust gas treatment devices when requested by a downstream emission control device.

As one example, each of the exhaust gas treatment devices may comprise an electrochemical cell comprising an anode and a cathode. Oxygen ions may flow from the cathode to the anode, which may result in an oxidation of nitrogen containing compounds (e.g., nitric oxide, NO) in an exhaust gas touching the anode. By doing this, a concentration of $NO_2$ leaving the exhaust gas treatment device may be higher than a concentration of $NO_2$ entering the exhaust gas treatment device. The increased concentration of $NO_2$ may be used in a downstream emission control device, wherein the $NO_2$ may enhance oxidation, reduction, and/or capture of pollutants in the exhaust gas flow.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
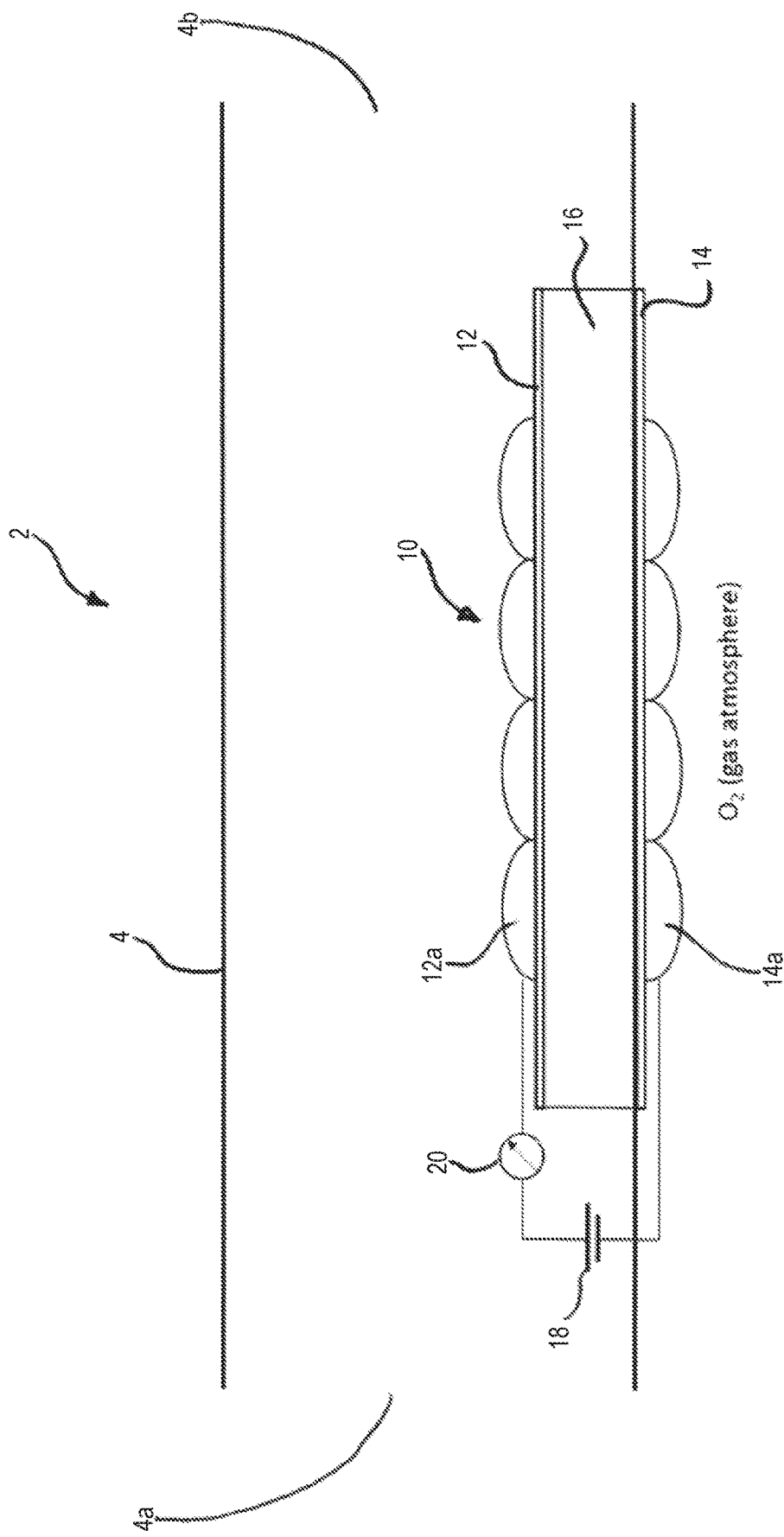
FIG. 1 illustrates a schematic of an engine included in a hybrid vehicle.
Figure 2:
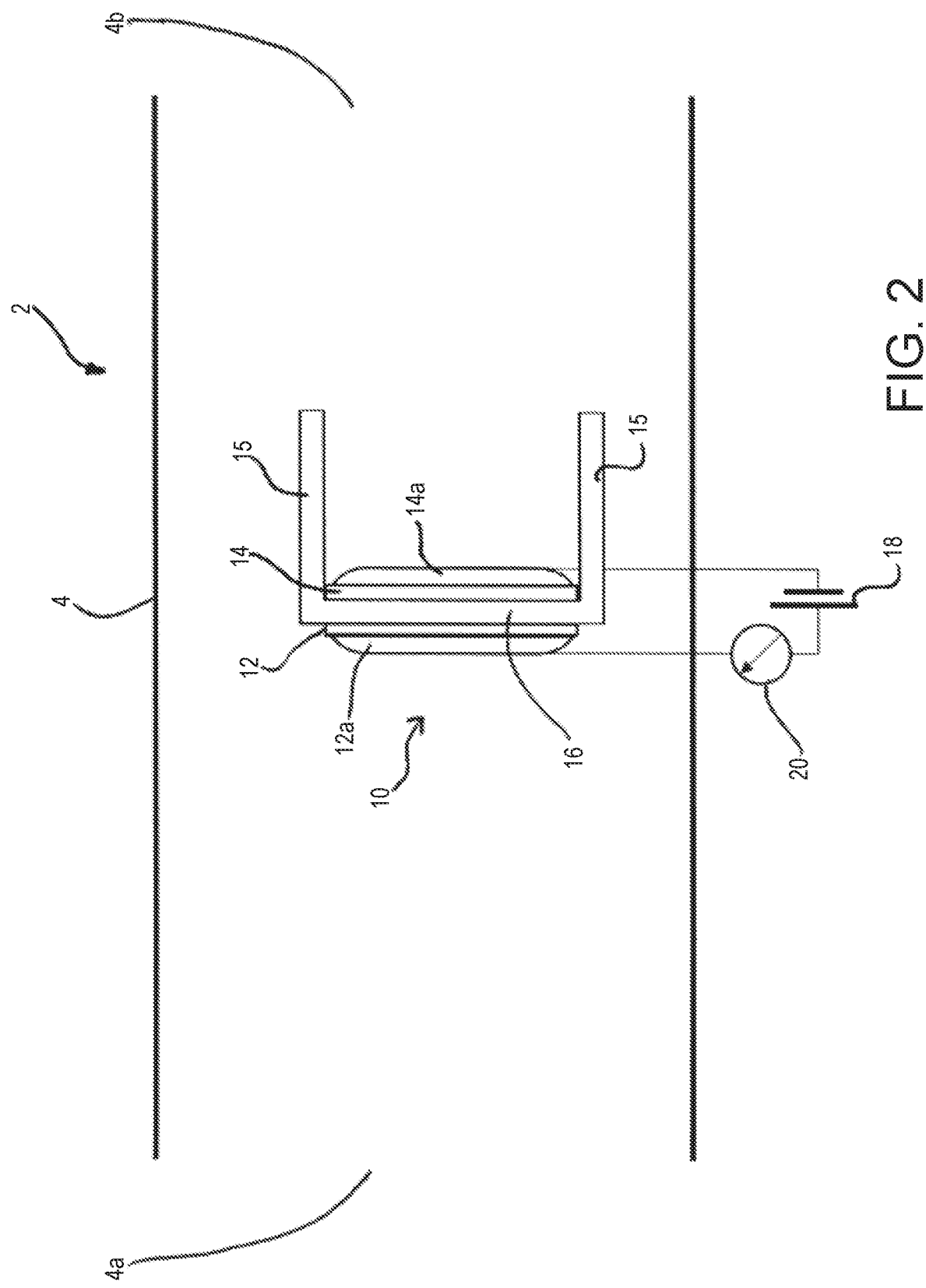
FIG. 2 illustrates a schematic sectional side view of an exhaust gas treatment device.
Figure 3:
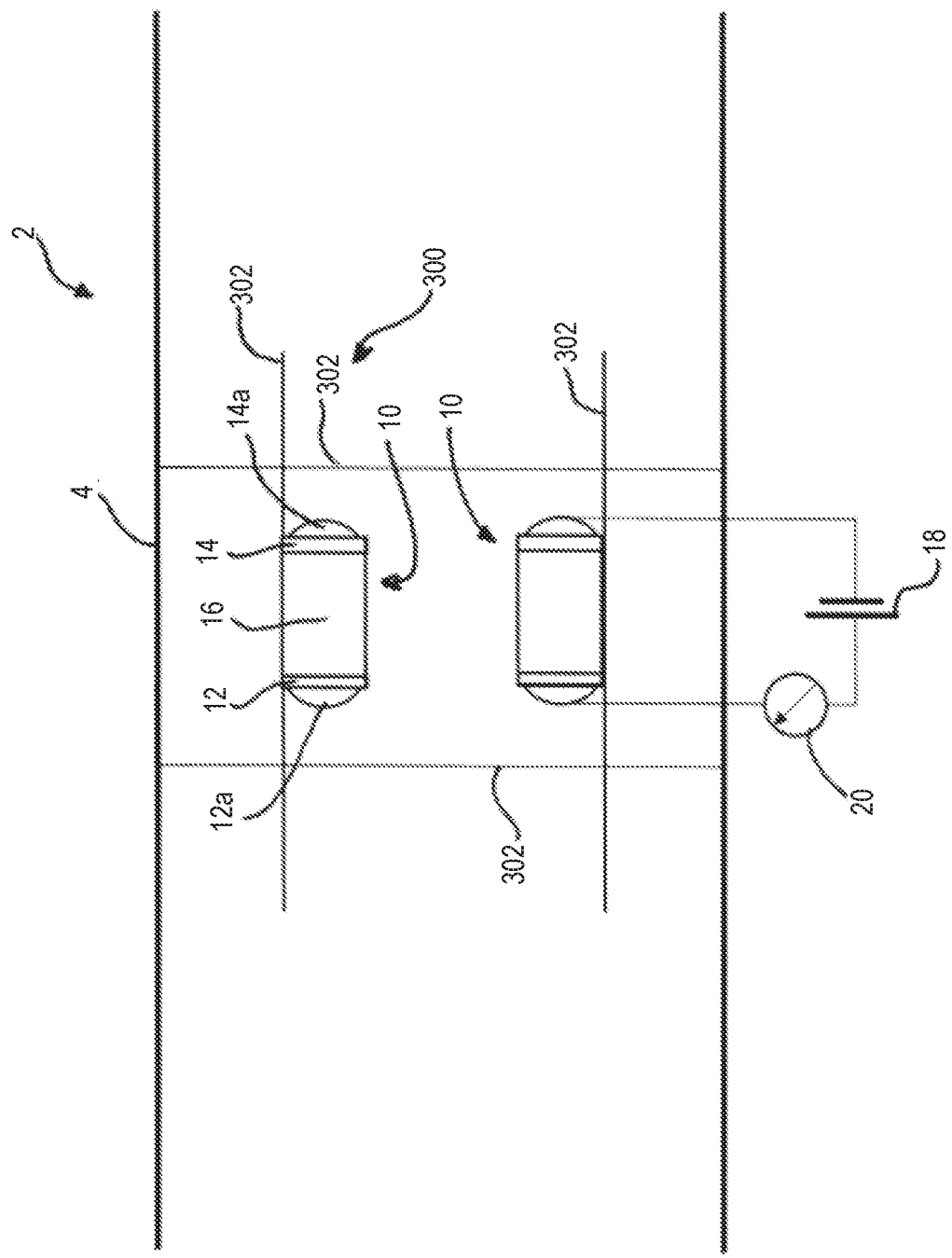
FIG. 3 illustrates another embodiment of a schematic sectional side view of an exhaust gas treatment device.
Figure 4:
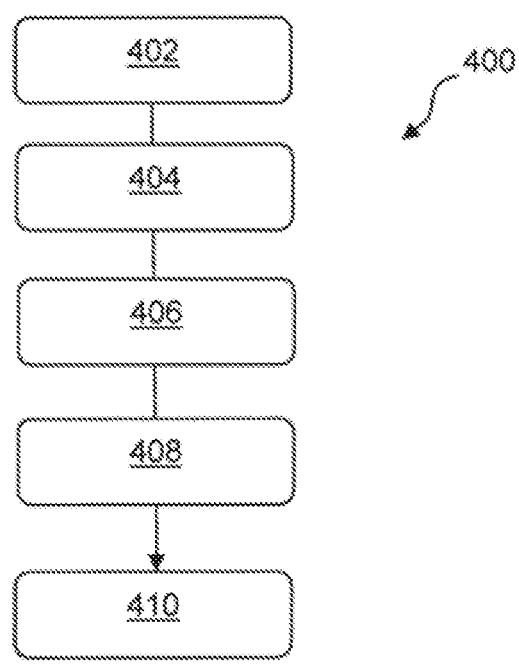
FIG. 4 illustrates a further embodiment of a schematic sectional side view of an exhaust gas treatment device.
Figure 7:
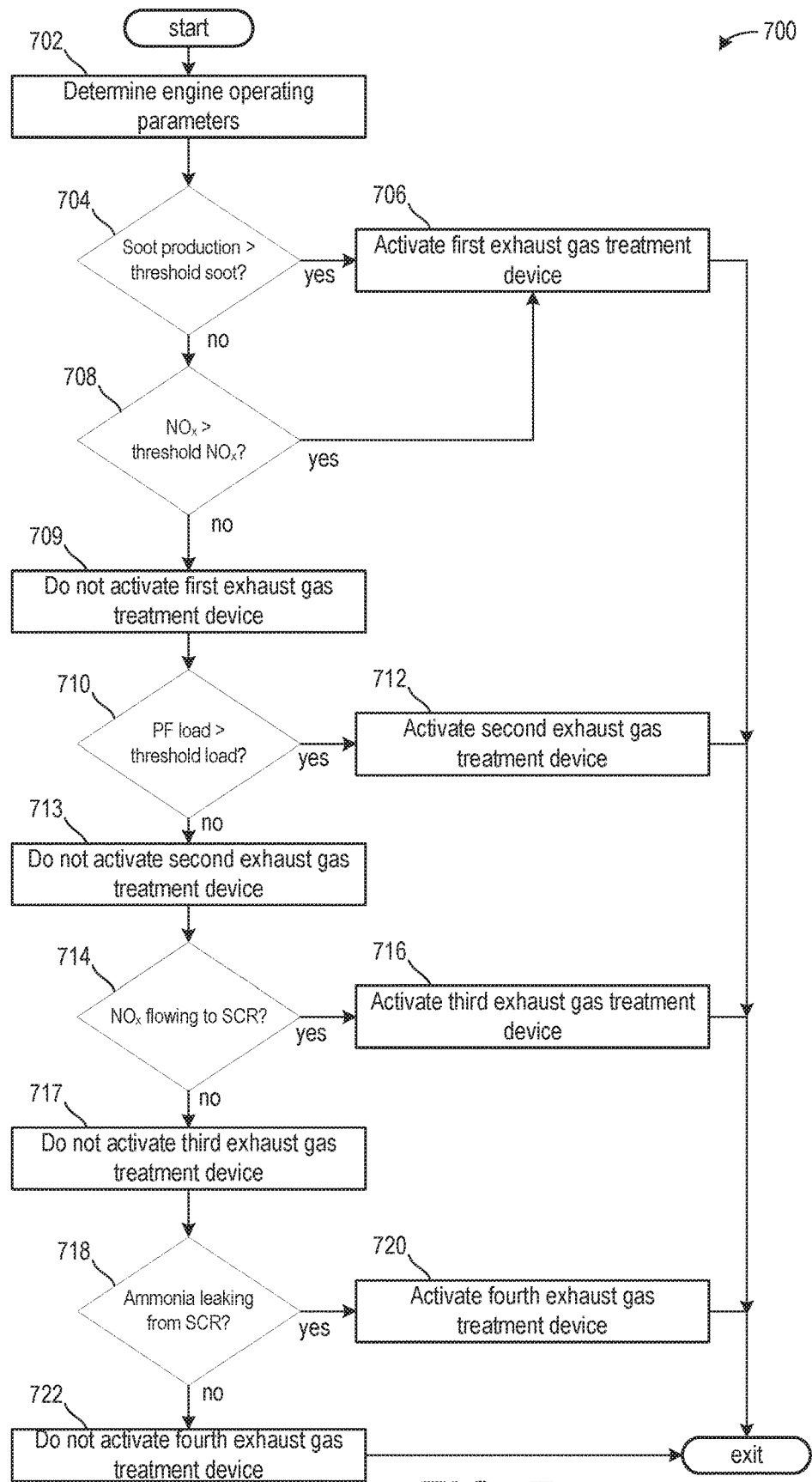
FIG. 7 shows a method for adjusting operation of one or more exhaust gas treatment devices.

The following description relates to systems and methods for an exhaust system comprising at least one exhaust gas treatment device. Embodiments of the exhaust gas treatment device are shown in FIGS. 1, 2, and 3. The exhaust gas treatment device may comprise an electrochemical cell arranged between a cathode and an anode. Oxygen ions (e.g., $O^{2-}$) may flow from the cathode to the anode, where the oxygen ions may oxidize nitrogen species in an exhaust gas contacting the anode. For example, nitric oxide, and other less oxidized nitrogen species may be converted to $NO_2$ such that a concentration of $NO_2$ leaving the exhaust gas treatment device may be higher than a concentration of $NO_2$ entering the exhaust gas treatment device. Methods for selectively activating the exhaust gas treatment device are shown in FIGS. 4 and 7.

Figure 5:
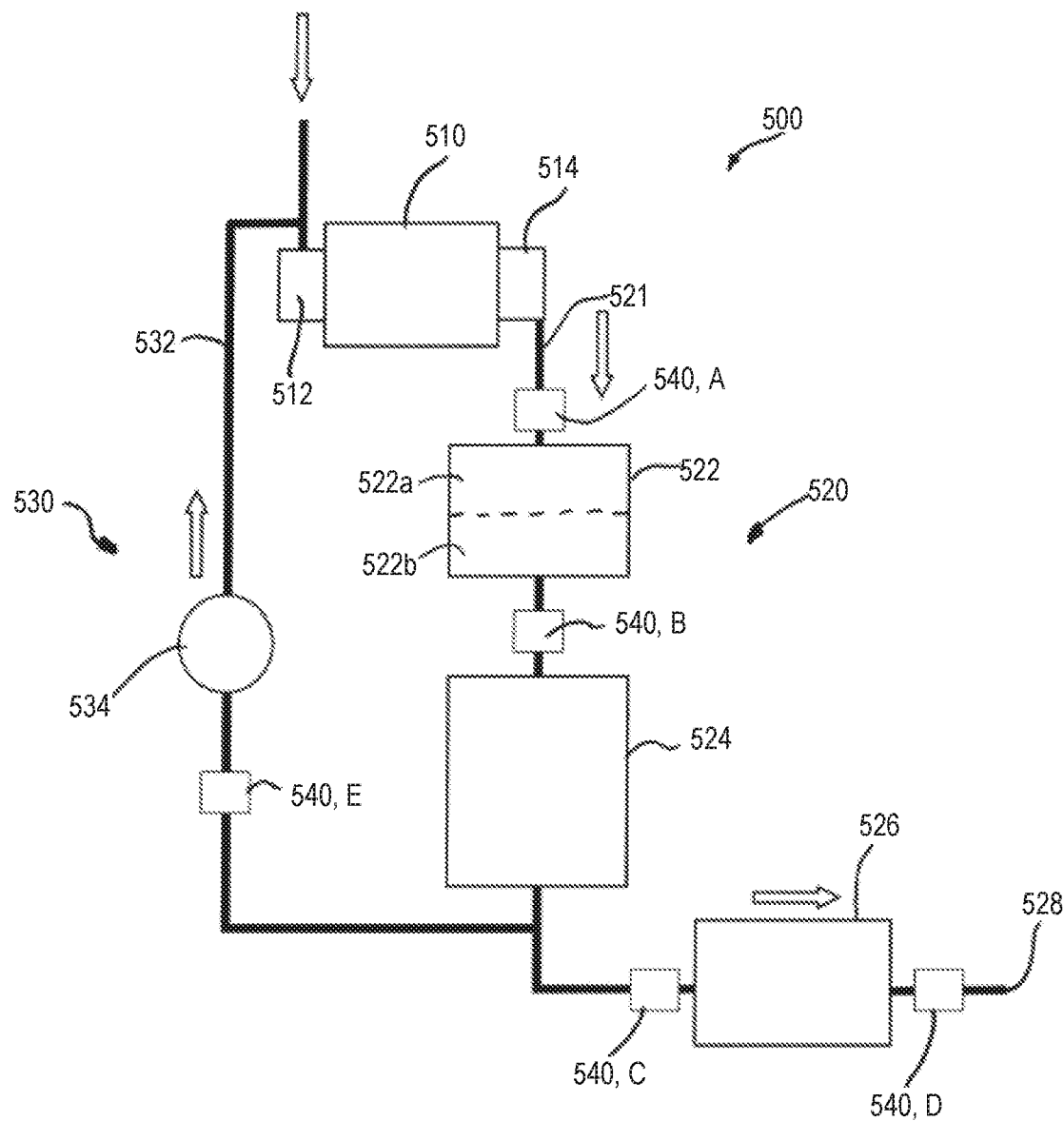
FIG. 5 illustrates a method for treating exhaust gases via the exhaust gas treatment devices.
Figure 6:
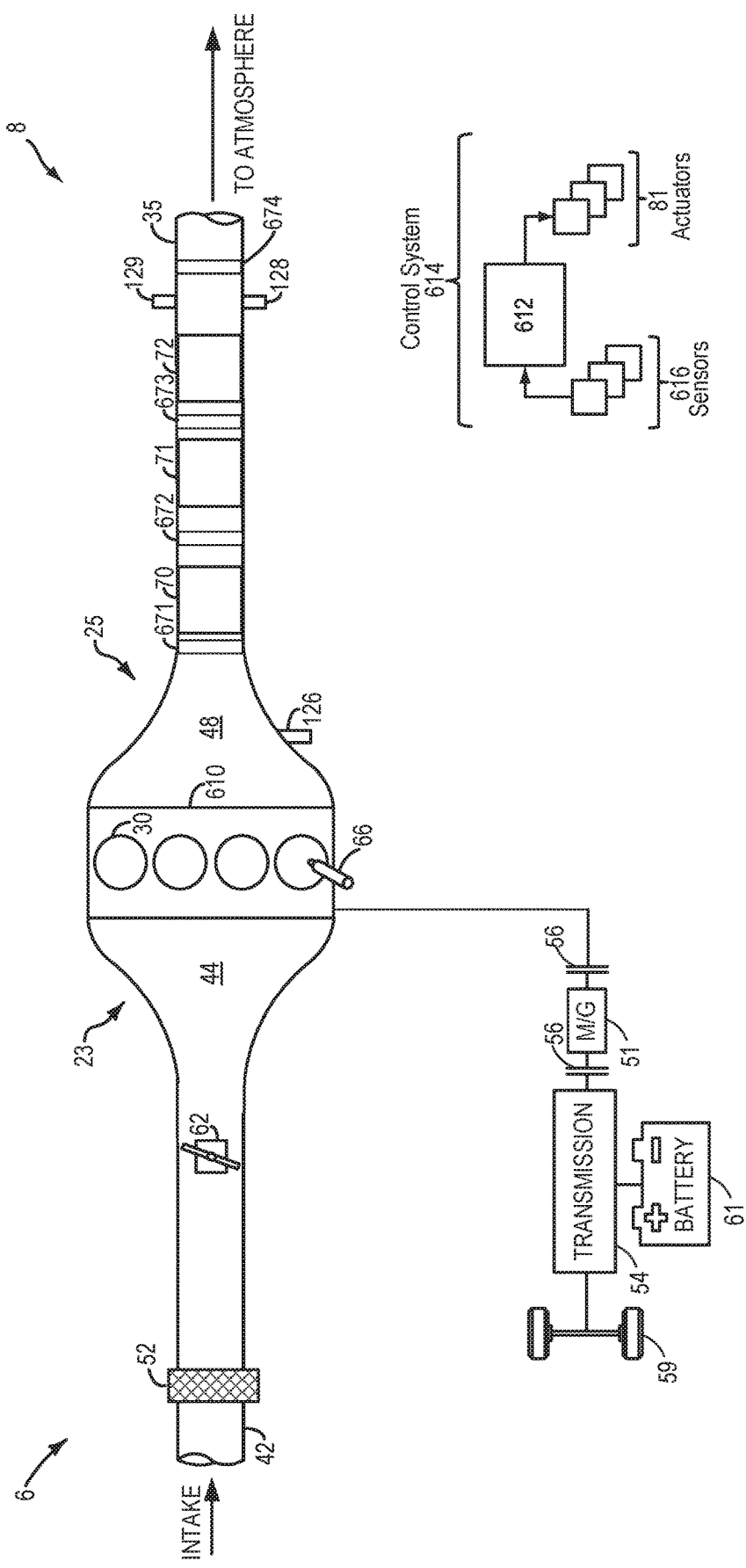
FIG. 6 shows a schematic view of an exhaust gas treatment system.

The exhaust gas treatment device may be arranged in an exhaust passage of a vehicle, as shown in FIGS. 5 and 6.

Figure 8:
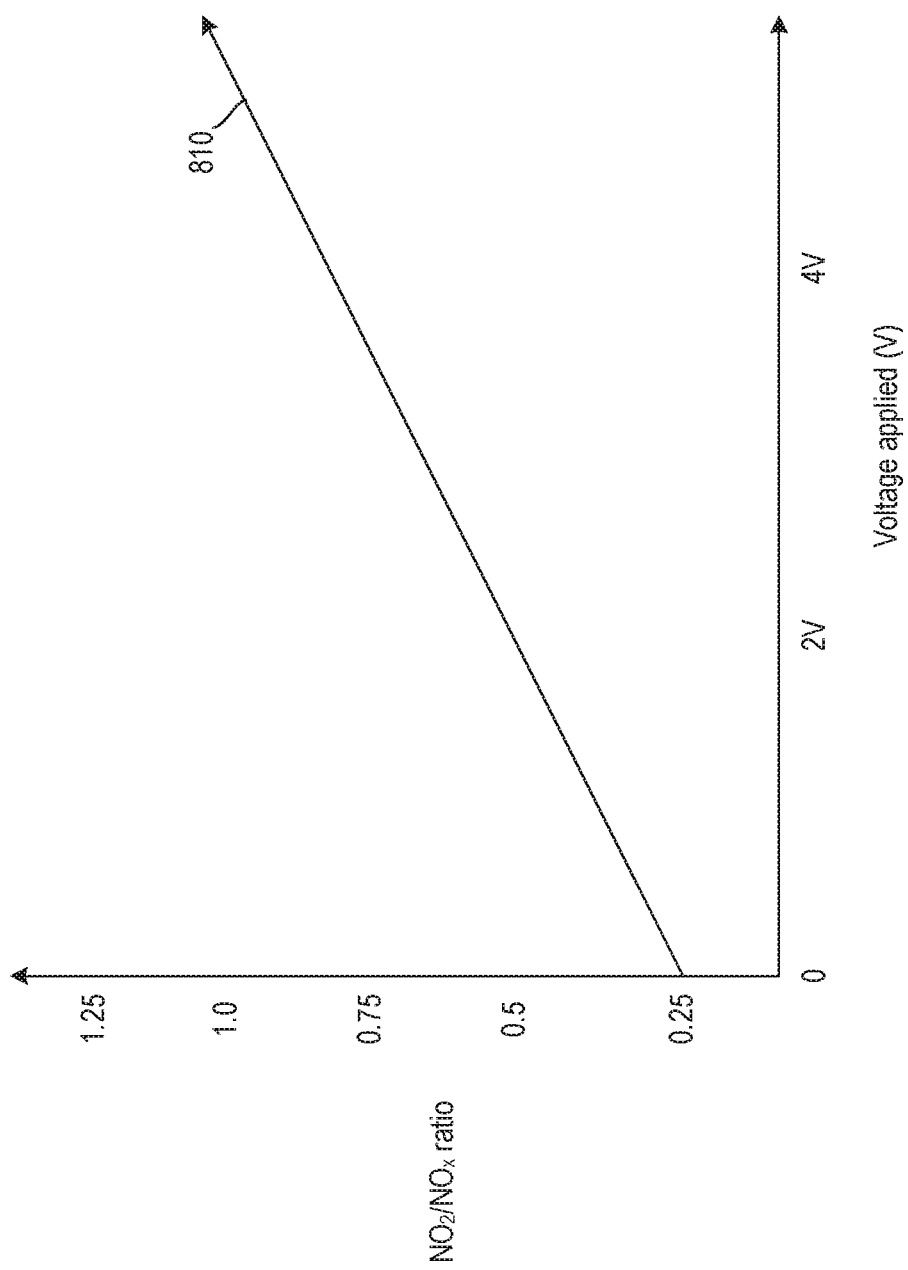
FIG. 8 shows a graph illustrating a relationship between a voltage applied to an exhaust gas treatment device and a ratio of $NO_2:NO_x$.

Therein, a plurality of exhaust gas treatment devices may be arranged along the exhaust passage. An emission control device may be arranged between adjacent exhaust gas treatment devices. In this way, the exhaust gas treatment device and the emission control device may alternate. Each of the exhaust gas treatment devices may be activated independently such that $NO_2$ concentrations may be elevated for a directly downstream emission control device. A ratio between $NO_2$:$NO_x$ based on a voltage applied to the exhaust gas treatment device is shown in FIG. 8.

FIGS. 1-3 and 5-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

According to one embodiment of the present disclosure, an exhaust gas treatment device comprising an electrochemical cell having a first electrode, a second electrode, and an electrolyte provided between the first and second electrodes is arranged along an exhaust passage. The electrochemical cell may be configured to convert nitric oxide within the exhaust gas to nitrogen dioxide, such that a concentration of the nitrogen dioxide within the exhaust gases leaving the exhaust gas treatment device is increased relative to the exhaust gases entering the exhaust treatment device, wherein the first and second electrodes of the electrochemical cell are arranged, such that the exhaust gases are in contact with the first and second electrodes.

The first and second electrodes may be arranged such that products of the reaction at the first electrode are in a lower concentration compared to the exhaust gases coming into contact with the second electrode than in the exhaust gases leaving the first electrode. In other words, the first and second electrodes may be arranged such that the concentration of nitrogen dioxide, e.g. in the exhaust gases, arriving at the second electrode is lower than the concentration of nitrogen dioxide, e.g. in the exhaust gases, leaving the first electrode.

The second electrode may be arranged downstream of the first electrode relative to a direction of exhaust gas flow. Additionally or alternatively, the exhaust gases leaving the first electrode may be directed away from the second electrode. Additionally or alternatively, the second electrode may be arranged in a region of substantially stagnant flow. The first and second electrodes may be arranged such that a flow rate of exhaust gases over the second electrode is less than the flow rate of exhaust gases over the first electrode.

The exhaust gas treatment device may comprise a duct having an inlet and an outlet for exhaust gases. The electrochemical cell may be arranged at least partially within the duct.

The first electrode of the electrochemical cell may be arranged within the duct. The second electrode may also be arranged within the duct.

The exhaust gas treatment device may comprise a catalyst coating, (e.g. a noble metal catalyst), such as a platinum group metal catalyst, applied to the first electrode and/or the second electrode.

The electrolyte may be configured to conduct oxygen-ions through the electrolyte. The electrolyte may comprise a solid electrolyte, such as a zirconium based electrolyte.

The first and second electrodes, and the electrolyte may be provided on a surface of a mesh or gauze arranged within the flow of exhaust gases.

The exhaust gas treatment device may further comprise a voltage source electrically connected to the electrochemical cell. The voltage source may be adjustable such that the voltage supplied to the electrochemical cell can be adjusted to affect the rate of conversion of the nitric oxide to the nitrogen dioxide.

The exhaust gas treatment device may comprise a current meter (e.g. an ammeter). The exhaust gas treatment device may further comprise a controller configured to determine an operating condition of the device based on a current measured by the current meter. For example, the controller may be configured to diagnose a fault based on the measured current.

According to another aspect, there is provided an exhaust gas treatment system comprising an exhaust duct; and one or more of the above-mentioned exhaust gas treatment devices.

At least one of the exhaust gas treatment devices may be provided in an exhaust gas recirculation duct configured to recirculate a portion of exhaust gases flowing within the exhaust duct to an engine inlet.

The system may further comprise a further exhaust gas treatment device provided downstream, (e.g. immediately downstream), of at least one of the exhaust gas treatment devices. The rate of reduction of the concentration of a constituent or group of constituents within the exhaust gases by the further exhaust gas treatment device may vary according to the concentration of nitrogen dioxide within the exhaust gases. For example, the further exhaust gas treatment device may be configured to utilize the nitrogen dioxide produced by the exhaust treatment device in a process for reducing the concentration of the constituent or group of constituents within the exhaust gases, such as NO, $NO_2$, $NO_x$ soot and/or particulates, and/or for improving the rate at which the process can be performed, (e.g. the nitrogen dioxide may be utilized in a regeneration process of the further exhaust gas treatment device).

The further exhaust gas treatment device may comprise a particulate filter, an oxidation catalyst, a passive $NO_x$ adsorber, a lean $NO_x$ trap, or a selective catalytic reduction device.

According to another aspect of the present disclosure, there is provided a method of treating exhaust gases comprising supplying a voltage across an electrochemical cell of an exhaust gas treatment device arranged at least partially within a flow of exhaust gases, so that nitric oxide, within the exhaust gas is converted to nitrogen dioxide, such that a concentration of the nitrogen dioxide within the exhaust gases is increased, wherein the electrochemical cell comprises a first electrode, a second electrode and an electrolyte provided between the first and second electrodes, wherein the first and second electrodes of the electrochemical cell are arranged, such that the exhaust gases are in contact with the first and second electrodes and providing a flow of exhaust gases having an increased concentration of the nitrogen dioxide to an exhaust gas treatment device arranged downstream of the electrochemical cell.

The method may comprise adjusting the voltage supplied across the electrochemical cell such that the concentration of the nitrogen dioxide is increased to a desired concentration, which may be based on a concentration of another species within the exhaust gases, such as the nitric oxide. For example, the voltage may be adjusted such that a ratio of $NO:NO_2$ is approximately equal to 0.5.

The method may comprise determining a current flowing though the electrochemical cell. The method may further comprise determining an operating condition of the electrochemical cell based on the current. For example, a fault with the electrochemical cell may be determined based on the current.

The electrochemical cell may be provided within the above-mentioned exhaust treatment device.

With reference to FIG. 1, an exhaust gas treatment device 2 according to arrangements of the present disclosure comprises a duct 4 having an inlet 4a and an outlet 4b to allow exhaust gases to flow into and out of the exhaust gas treatment device 2.

The exhaust gas treatment device 2 comprises an electrochemical cell 10. The electrochemical cell 10 comprises a first electrode 12, a second electrode 14, and an electrolyte 16 arranged between the first and second electrodes 12, 14.

In the arrangement depicted in FIG. 1, the electrolyte 16 comprises a solid electrolyte configured to transmit a charge between the first and second electrodes 12, 14 by virtue of the movement of $O^{2-}$ ions through the electrolyte. For example, the electrolyte 16 may comprise a zirconium based material comprising free $O^{2-}$ ions.

The exhaust gas treatment device 2 further comprises a voltage source 18 electrically connected to the first and second electrodes 12, 14. In the arrangement depicted in FIG. 1, a positive terminal of the voltage source 18 is connected to the first electrode 12 such that the first electrode forms the anode of the electrochemical cell 10. A negative terminal of the voltage source 18 is connected to the second electrode 14, such that the second electrode forms the cathode of the electrochemical cell. Free $O^{2-}$ ions within the electrolyte 16 are therefore caused to migrate towards the first electrode 12.

As depicted, the first electrode 12 is arranged such that exhaust gases within the duct 4 flow over the first electrode 12. The electrochemical cell 10 is thereby configured such that substances, (e.g. a pollutant species), within the exhaust gases can be oxidized by the electrochemical cell. In particular, nitric oxide (NO) within the exhaust gases can be oxidized according to reaction 1 to produce nitrogen dioxide ($NO_2$), e.g. a further pollutant species.

$$NO + O^{2-} \rightarrow NO_2 + 2e^- \tag{1}$$

In some arrangements, other reducing agent species within the exhaust gases, such as ammonia, can be oxidized as the exhaust gases flow over the first electrode 12, as described below.

When the exhaust gas treatment device 2 is operated, by applying a voltage between the first and second electrodes 12, 14. The oxidation of nitric oxide at the first electrode 12, (e.g. according to reaction (1)), increases the concentration of nitrogen dioxide within the exhaust gases leaving the exhaust gas treatment device 2, relative to the exhaust gases entering the exhaust gas treatment device 2. That is to say, exhaust gases entering the exhaust gas aftertreatment device 2 via the inlet 4a may comprise a lower concentration of $NO_2$ than exhaust gases exiting the exhaust gas aftertreatment device 2 via the outlet 4b.

As shown in FIG. 1, the first and/or second electrode may be at least partially covered by a catalytic coating 12a, 14a, respectively, such as a platinum group metal catalyst coating. Providing a catalytic coating on the first and/or second electrode may increase the rate of oxidation of NO at the first electrode 12.

If the exhaust gases contact, (e.g. flow over), the second electrode 14, species within the exhaust gases may be reduced. For example, nitrogen dioxide may be reduced, (e.g. to nitrogen gas), reducing the concentration of nitrogen dioxide within the exhaust gases.

In some arrangements, it may be desirable to reduce the concentration of nitrogen dioxide within the exhaust gases, in order to reduce the concentration of pollutant species being emitted from the vehicle. However, in other arrangements, such as those described with reference to FIG. 4 below, it may be desirable for the concentration of nitrogen dioxide in the exhaust gases leaving the exhaust gas treatment device 2 to be increased. In such arrangements, the second electrode 14 may be arranged such that exhaust gases are deterred, restricted, or blocked from contacting the second electrode 14.

As depicted in FIG. 1, the second electrode 14 may be arranged outside of the duct 4, (e.g. outside a wall of the duct 4). Alternatively, the second electrode 14 may be arranged within the duct 4 in an area in which exhaust gases are not directed to flow over the second electrode. The flow rate of exhaust gases over the second electrode 14 may be less than the flow rate of exhaust gases over the first electrode 12. For example, the second electrode 14 may be arranged in an area of the exhaust gas treatment device 2 in which exhaust gases are substantially stagnant.

In some arrangements, the second electrode 14 may be arranged such that exhaust gases are discouraged from contacting the second electrode after the exhaust gases have passed over the first electrode 12. For example, the second electrode 14 may be arranged upstream of the first electrode 12, (e.g. with respect to the flow of exhaust gases through the exhaust gas treatment device 2). Such arrangements may mitigate nitrogen dioxide production through oxidation of NO at the first electrode 12 being subsequently reduced at the second electrode 14.

With reference to FIG. 2, in some arrangements, the second electrode 14 may be arranged downstream of the first electrode 12 in a wake of the first electrode 12, so that the products of the reaction at the first electrode substantially bypass the second electrode 14. As depicted, the electrochemical cell 10 may comprise a wall 15 extending at least partially downstream from the first electrode 12 to direct exhaust gases from the first electrode 12 away from the second electrode 14. The wall 15 may extend circumferentially around the second electrode 14. Said another way, the wall 15 may be shaped to direct exhaust gases toward an outer circumference of the exhaust gas treatment device 2 away from the second electrode 14.

In the arrangement depicted in FIG. 1, the electrochemical cell 10 is arranged adjacent to the wall of the duct 4. The electrochemical cell 10 may be coupled to the wall of the duct 4. The wall of the duct 4 may form a substrate on which the electrochemical cell is formed.

The wall of the duct 4 may define an opening through which at least part of the electrochemical cell protrudes. For example, as shown in FIG. 2, the second electrode may protrude through an opening in the wall of the duct. The second electrode 14 may thereby be positioned in an oxygen rich environment, relative to the environment within the duct 4, such as in atmospheric air. In some arrangements, a portion of the wall of the duct 4 may form part of the electrochemical cell 10, such as the second electrode 14.

With reference to FIG. 3, in other arrangements, the electrochemical cell 10 may be provided on a grid or mesh 300, such as a honeycomb mesh, arranged within the duct 4. The mesh 300 may comprise a plurality of mesh elements 302, which may form substrates on which the first and second electrodes 12, 14 and the electrolyte 16 are provided. In other words, the mesh 300 may support the electrochemical cell 10 within the duct 4.

In some arrangements, a plurality of electrochemical cells may be arranged within the duct 4. For example, different electrochemical cells may be provided on different ones or groups of the mesh elements 302.

As shown in FIGS. 1 and 3, the exhaust gas treatment device 2 may further comprise a current meter, (e.g. ammeter), 20 configured to measure the electrical current passing through the electrical connection between the first and second electrodes. The current meter 20 may be used to obtain operating information relating to the operation of the exhaust gas treatment device 10, as described below.

With reference to FIG. 4, the exhaust gas treatment device 2 may be operated using a method 400. The method 400 comprises a first step 402, in which a voltage is provided across the electrochemical cell 10, so that nitric oxide within the exhaust gases is converted to nitrogen dioxide, thereby increasing the concentration of nitrogen dioxide within the exhaust gases.

The method 400 comprises a second step 404, in which the voltage applied across the electrochemical cell is adjusted such that the concentration of nitrogen dioxide is increased to a desired concentration.

In a third step 406, a current flowing though the electrochemical cell may be determined, e.g. by referring to a measurement recorded by the current meter 20. In a fourth step 408 an operating condition of the electrochemical cell may be determined based on the current measurement.

The value of current measured by the current meter 20 may correspond to the rate of oxidation at the first electrode 12. Hence, if the value of current measured drops below a threshold level, it may be determined that a fault has occurred with the exhaust gas treatment device 2 that is preventing oxidation of nitric oxide at the first electrode 12. The method 400 may comprise a fifth step 410, in which a fault with the electrochemical cell is diagnosed based on the current.

In addition or as an alternative to diagnosing a fault with the exhaust gas treatment device 2 based on the measured current, a predicted rate of oxidation at the first electrode 12 may be determined based on the measured current. The predicted rate of oxidation may be compared to a desired rate of oxidation. The desired rate of oxidation may be selected in order to provide a desired concentration of NO2 within the exhaust gases leaving the exhaust gas treatment device 2. The voltage provided by the voltage source 18 may be adjusted, in order to adjust the rate of oxidation to be equal or substantially equal to the desired oxidation rate.

Furthermore, the current measured by the current meter 20 and the value of voltage supplied by the voltage source 18 may be used to predict a concentration of NO and/or NO2 present within the exhaust gases.

The method 400 may comprise a further step, in which a portion of one or more pollutant species, such as nitrogen dioxide, present within the exhaust gases is reduced, e.g. by virtue of an electrochemical reaction occurring at the second electrode 14, so that the concentration of pollutant species, (e.g. $NO_2$), within the exhaust gases leaving the exhaust gas treatment device 2 is reduced relative to the exhaust gases entering the exhaust gas treatment device. Alternatively, a flow of exhaust gases having an increased concentration of nitrogen dioxide may be provided to an exhaust gas treatment device arranged downstream of the exhaust gas treatment device 2 comprising the electrochemical cell 10.

With reference to FIG. 5, an engine assembly 500 for a motor vehicle comprises an engine 510, and an exhaust system 520.

The engine 510 has an inlet manifold 512, through which inlet gases enter the engine 510, and an outlet manifold 514. Exhaust gases produced through combustion within the engine 510 leave via the outlet manifold 514 and enter an exhaust duct 521 of the exhaust system 520.

The exhaust system 520 may comprise one or more exhaust gas treatment devices. In the arrangement shown, the exhaust system 520 comprises a catalytic oxidation device 522a, e.g. a Diesel Oxidation Catalyst (DOC), a NOX adsorber 522b, such as a Passive NOX Adsorber (PNA) or Lean $NO_x$ Trap (LNT), a particulate filter 524, e.g. a Diesel Particulate Filter (DPF), and a Selective Catalytic Reduction (SCR) device 526. In other arrangements one or more of the exhaust gas treatment devices may be omitted or substituted with alternative devices. Additionally or alternatively, one or more further exhaust gas treatment devices may be provided.

One or more of the exhaust gas treatment devices may be combined devices. For example, as depicted in FIG. 5, the exhaust system 520 comprises a combined DOC/LNT 522. However, in other arrangements, each of the exhaust gas treatment devices may be separate.

The exhaust system 520 further comprises one or more exhaust gas treatment devices comprising electrochemical cells 540. The exhaust gas treatment devices comprising electrochemical cells 540 may be configured in the same way as the exhaust gas treatment device 2 described above. The features described in relation to the exhaust treatment device 2 may apply equally to the exhaust gas treatment devices 540.

The exhaust gas treatment devices comprising electrochemical cells 540 may be provided in one or more of the locations A, B and C, and may affect the operation of the other exhaust gas treatment devices within the exhaust system 520 as detailed below.

The catalytic oxidation device 522a is configured to encourage the oxidation of soot and/or carbon monoxide within the exhaust gases. In the arrangement shown, the catalytic oxidation device 522a comprises a substrate, e.g. a honeycomb substrate, on which a wash coat is provide comprising a catalyst, such as a platinum group metal catalyst, to facilitate the removal of soot and/or carbon monoxide.

The ability of the catalytic oxidation device 522a to oxidize soot and/or carbon monoxide may be affected by the concentration of $NO_2$ within the exhaust gases. In particular, an increased concentration of $NO_2$ may allow the rate of oxidation of soot and/or carbon monoxide to be maintained at increased level for longer time periods. In some arrangements, an increased concentration of $NO_2$ with the exhaust gases may allow the increased rate of oxidation of soot and/or carbon monoxide to be maintained substantially continuously.

When one of the exhaust gas treatment devices 540 is provided in the location A, e.g. upstream of the catalytic oxidation device 522a, the amount of soot and/or carbon monoxide removed from the exhaust gases may be increased during a period of operation of the engine assembly. More specifically, the exhaust gas treatment device 540 may deliberately increase $NO_2$ concentrations to increase oxidation of soot and/or carbon monoxide in the catalytic oxidation device 522a.

The $NO_x$ adsorber 522b is configured to remove $NO_x$ compounds, such as NO and NO2, from the exhaust gases. In the arrangements shown, the $NO_x$ adsorber 522b comprises an adsorbent catalyst that stores $NO_x$, such as a barium or cerium catalyst, that adsorbs $NO_x$ from the exhaust gases, trapping it within the $NO_x$ adsorber. When the $NO_x$ adsorber 522b is full, e.g. when no more $NO_x$ can be adsorbed, the $NO_x$ adsorber 522b may be regenerated by causing the $NO_x$ to be desorbed from the catalyst and reacting the $NO_x$ with hydrocarbons to produce water and nitrogen.

The rate of adsorption of $NO_x$ into the $NO_x$ adsorber 522b and/or the total amount of $NO_x$ that may be stored within the $NO_x$ adsorber 522b may be affected by the concentration of $NO_2$ within the exhaust gases entering the $NO_x$ adsorber 522b. In particular, when the concentration of $NO_2$ is increased, the rate of adsorption and/or total amount of $NO_x$ that may be stored may also increase. Hence, when one of the exhaust gas treatment devices 540 is provided in the location A, e.g. upstream of the $NO_x$ adsorber 522b, the amount of $NO_x$ removed from the exhaust gases by the $NO_x$ adsorber 522b (e.g., a lean $NO_x$ trap) may be increased. In one example, if an air/fuel ratio is lean and $NO_x$ emissions are relatively high compared to other engine conditions where the air/fuel ratio is less lean, then the exhaust gas aftertreatment device 540 may increase $NO_2$ in the exhaust gas so that the $NO_x$ adsorber 522b may capture more $NO_x$ to decrease emissions.

The particulate filter 524 is configured to remove particulate matter (PM), e.g. soot, from the exhaust gases by trapping the PM within the filter. The particulate filter 524 may be regenerated by burning off or oxidizing the trapped PM by virtue of a catalyst, to enable more soot to be stored.

Regeneration of the particulate filter 524 may be performed in the presence of oxygen or in the presence of $NO_2$. When the particulate filer 524 is regenerated in the presence of oxygen, the particulate filter is typically heated to a high temperature. However, if the particulate filter 524 is regenerated in the presence of $NO_2$, the temperature at which the particulate filter can be regenerated is reduced. When the concentration of $NO_2$ within the exhaust gases is sufficiently high, it may not be necessary to elevate the temperature of the particulate filter 524 from a normal operating temperature in order to trigger regeneration (of at least a more moderate temperature increase may be sufficient).

When one of the exhaust gas treatment devices 540 is provided in the location B, e.g. upstream of the particulate filter 524, the particulate filter 524 may be regenerated at its normal operating temperature. In other words, the exhaust treatment device 540 may enable substantially continuous oxidation of soot within the particulate filter 524. That is to say, active regeneration of the particulate filter 524 may occur by activating the exhaust gas treatment device 540 in the location B to increase $NO_2$ concentrations, which may promote particulate filter regeneration without increasing an exhaust gas temperature.

The SCR device 526 is configured to convert $NO_x$ compounds present in the exhaust gases to nitrogen gas and water through a chemical reduction process. In the arrangement shown in FIG. 5, urea may be injected into the exhaust system by a SCR dosing system (not shown) and undergoes thermal decomposition and hydrolysis to produce ammonia. The ammonia produced may act as the reductant in the SCR device 426.

The rate at which $NO_x$ is reduced within the SCR device 526, (e.g. by the ammonia), may be affected by the relative concentrations of NO and $NO_2$ within the exhaust gases. In particular, the rate of reduction of $NO_x$ may reach a maximum when the ratio of $NO_2:NO_x$ is approximately 0.5.

When one of the exhaust gas treatment devices 540 is provided in the location C, e.g. upstream of the SCR device 526, the exhaust gas treatment device 540 may be operated to adjust the concentration of $NO_2$ within the exhaust gases, e.g. such that the ratio of $NO_2:NO_x$ is adjusted, in order to increase the rate of reduction of $NO_x$ within the SCR device 526.

As described above, the exhaust gas treatment device 2, similar to one of the exhaust gas treatment device 540, comprises a voltage source 18. The voltage supplied by the voltage source 18 may be controlled in order to affect the rate of oxidation of NO to $NO_2$ by the exhaust gas treatment devices 540, in order to adjust the ratio of $NO_2:NO_x$ within the exhaust gases.

The exhaust system 500 may further comprise a $NO_x$ sensor (not shown) configured to determine the concentration of $NO_x$, NO, $NO_2$ and/or the $NO_2:NO_x$ ratio. The measurement recorded by the $NO_x$ sensor may be used to control the operation of the exhaust gas treatment device 540 in order to provide the desired $NO_2:NO_x$ ratio.

Additionally or alternatively, a measurement of the current passing through the electrochemical cell 10 of the exhaust gas treatment device 540, e.g. measured by the current meter 20 may be used to determine or estimate the concentration of NO, $NO_2$ and/or $NO_x$ within the exhaust gases. For example, a take up rate of $O^{2-}$ ions by the exhaust gases may be determined based on the current recorded by the current meter 20, which may be used to infer a concentration of NO.

It may be desirable to block the urea added to the exhaust system by the SCR dosing system from being oxidized. Hence, when the exhaust gas treatment device 540 is provided in location C, e.g. upstream of the SCR device 526, the exhaust gas treatment device 540 may be arranged upstream of the SCR dosing system.

Any ammonia that is not reacted with $NO_x$ within the SCR device 526 may leave the SCR device and flow within the exhaust gases towards an exhaust outlet 528 of the exhaust system 520. It may be desirable to prevent ammonia from being emitted from the exhaust outlet 528, and hence, one of the exhaust gas treatment devices 540 may be provided at location D. If ammonia passes over the first electrode 12 of the exhaust gas treatment device 540, the ammonia may be oxidized to $NO_x$ and water, the emission of which may be desired over the emission of ammonia. The exhaust gas treatment device 540 may be provided at location D in addition to or as an alternative to being provided in one or more of the locations A-C.

The engine assembly 500 may further comprise an exhaust gas recirculation (EGR) system 530. The EGR system comprises an EGR duct 532 configured to allow a flow of exhaust gases to be recirculated to the inlet manifold 512 of the engine 510 and an EGR valve 534 configured to control the flow of exhaust gases within the EGR duct 532.

In the arrangement shown, the engine 510 is a naturally aspirated engine. However, in other arrangements the engine assembly 500 may comprise a turbocharger including an exhaust turbine arranged within the exhaust duct 521. In such arrangements, the EGR system 530 may be a low pressure EGR system configured to recirculate exhaust gases from a position on the exhaust duct downstream of the turbine. Alternatively, the EGR system may be a high pressure EGR system configured to recirculate exhaust gases from a position on the exhaust duct upstream of the turbine. In some arrangements, both low pressure and high pressure EGR systems may be provided. The features described herein may apply equally to low pressure and high pressure EGR systems.

It may be desirable to block and/or mitigate any ammonia present within the exhaust gases, from being recirculated by the EGR system 530 so that ammonia does not enter an inlet compressor and/or the engine inlet. One of the exhaust gas treatment devices 540 may be provided in location E in the EGR duct 532, to oxidize any ammonia within the recirculated exhaust gases. The exhaust gas treatment device 540 may be provided at location E in addition to or as an alternative to being provided in one or more of the locations A-D.

Turning now to FIG. 6, it shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 610 having a plurality of cylinders 30. Engine 610 may be used similarly to engine 510 of FIG. 5. Engine 610 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70, 71, and 72 mounted in a close-coupled position. In some examples, additionally or alternatively, the one or more emission control devices may be mounted in a far vehicle underbody without departing from the scope of the present disclosure. The one or more emission control devices may include a three-way catalyst, lean $NO_x$ trap, a particulate filter, an oxidation catalyst, a selective reduction catalyst (SCR), etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

In some examples, a first emission control device 70 may be used similarly to the catalytic oxidation device 522A and the $NO_x$ adsorber 522B of FIG. 5. A first exhaust gas treatment device 671, which may be used similarly to exhaust gas treatment device 2 of FIGS. 1-3 and one of exhaust gas treatment devices 540 arranged at the location A of FIG. 5, may be arranged upstream of the first emission control device 70 and configured to adjust an amount of $NO_2$ in the exhaust gas flowing to the first emission control device 70 to enhance its chemical activity with regard to emission oxidation, reduction, and/or capture. In one example, the first exhaust gas treatment device 671 receives a signal from a controller 612 based on feedback from one or more sensors to increase $NO_2$ by supplying a voltage to an electrochemical cell (e.g., electrochemical cell 10 of FIGS. 1, 2, and 3) of the first exhaust gas treatment device 671 so that when exhaust gas contacts an anode of the electrochemical cell (e.g., a first electrode 12 of FIGS. 1-3), $NO_x$ is converted to $NO_2$. The increase in $NO_2$ may allow the catalytic oxidation portion of the first emission control device 70 to oxidize a greater amount of soot and/or particulates. This may be desired if a particulate filter downstream of the first emission control device 70 is fully loaded or if soot production is relatively high in a current engine operating condition. Furthermore, the $NO_2$ increase may allow the $NO_x$ adsorber portion to capture more $NO_x$, which may be desired if an SCR device downstream of the first emission control device 70 is degraded or requests reductant replenishment. However, as described above, it may be desired to mitigate reductant flow to an EGR passage, as the reductant (e.g., ammonia) may be converted to $NO_x$ during combustion. As such, if conditions for reductant injection into the exhaust passage are not met due to EGR flowing, then it may be desired to activate the first exhaust gas treatment device 671 to promote further capture of $NO_x$ at the $NO_x$ adsorber.

A second exhaust gas treatment device 672 may be arranged downstream of the first emission control device 70. The second exhaust gas treatment device 672 may be similar to the first exhaust gas treatment device 671. Additionally or alternatively, the second exhaust gas treatment device 672 may be used similarly to exhaust gas treatment device 540 at location B in FIG. 5. The second exhaust gas treatment device 672, arranged upstream of a second emission control device 71, may be configured to increase a flow of $NO_2$ to the second emission control device 71. The second exhaust gas treatment device 672 may be activated and receive an electric current in response to the second emission control device 71 requesting an oxidation of a material stored thereon. In one example, the second emission control device 71 is a particulate filter (PF). As such, the second emission control device 71 may request a regeneration in response to an amount of soot stored thereon exceeding a threshold load. This request may be determined in response to an exhaust backpressure exceeding a threshold backpressure and/or a soot load on the second emission control device 71 may be tracked over time. At any rate, if the second emission control device 71 requests that soot be burned and/or oxidized therefrom, then the second exhaust gas treatment device 672 may be activated to increase $NO_2$ flow to the second emission control device 71 to promote removal of soot without increasing an exhaust gas temperature. As such, the regeneration of the second emission control device 71 may be an active regeneration without increasing an exhaust gas temperature and without injecting a substance into the exhaust 25.

A third exhaust gas treatment device 673, which may be substantially identical to the first and second exhaust gas treatment device 671, 672, may be arranged downstream of the second emission control device 71 and upstream of a third emission control device 72. The third exhaust gas treatment device 673 may be used similarly to exhaust gas treatment device 540 at location C of FIG. 5. The third emission control device 72 may be an SCR device, in one example. Thus, the third emission control device 72 may treat (e.g., reduce) $NO_x$. The third exhaust gas treatment device 673 may be activated to increase an amount of $NO_2$ flowing to the third emission control device 72, which may increase $NO_x$ reduction at the third emission control device 72. In one example, while the first and second exhaust gas treatment devices 671, 672 may increase $NO_2$ concentration to a higher concentration, the third exhaust gas treatment device 673 may be used to increase $NO_2$ concentrations so that a desired ratio of $NO_2:NO_x$, is achieved to enhance reduction of NO at the SCR. In one example, the desired ratio of $NO_2:NO_x$ is 0.5.

A fourth exhaust gas treatment device 674 may be arranged downstream of the third emission control device 673. The fourth exhaust gas treatment device 674 may be used similarly to the exhaust gas treatment device 540 at location D of FIG. 5. The fourth exhaust gas treatment device 674 may be activated in response to ammonia leaking from the third emission control device 673. By doing this, the fourth exhaust gas treatment device 674 may covert ammonia that would be leaked to an atmosphere to $NO_2$, which may be more desirable.

Vehicle system 6 may further include control system 614. Control system 614 is shown receiving information from a plurality of sensors 616 (various examples of which are described herein) and sending control signals to a plurality of actuators 81 (various examples of which are described herein). As one example, sensors 616 may include exhaust gas sensor 126 located upstream of the emission control device, temperature sensor 128, pressure sensor 120, and pressure sensor 129. Other sensors such as additional pressure, temperature, air/fuel ratio, and composition sensors may be coupled to various locations in the vehicle system 6. As another example, the actuators may include fuel injector 66 and throttle 62.

Controller 612 may be configured as a conventional microcomputer including a microprocessor unit, input/output ports, read-only memory, random access memory, keep alive memory, a controller area network (CAN) bus, etc. Controller 612 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 610 and an electric machine 51. Electric machine 51 may be a motor or a motor/generator. A crankshaft of engine 610 and electric machine 51 may be connected via a transmission 54 to vehicle wheels 59 when one or more clutches 56 are engaged. In the depicted example, a first clutch 56 is provided between crankshaft 40 and electric machine 51, and a second clutch 56 is provided between electric machine 51 and transmission 54. Controller 612 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 7, it shows a method 700 for adjusting one or more exhaust gas treatment devices. Instructions for carrying out method 700 and the method of FIG. 4 above may be executed by a controller based on instructions stored on a memory of the controller and in conjunction with signals received from sensors of the engine system, such as the sensors described above with reference to FIG. 6. The controller may employ engine actuators of the engine system to adjust engine operation, according to the methods described below.

The method 700 begins at 702, which includes determining, estimating, and/or measuring one or more engine operating parameters. The engine operating parameters may include, but are not limited to one or more of a manifold vacuum, a throttle position, an engine speed, a vehicle speed, an engine temperature, an EGR flow rate, and an air/fuel ratio.

The method 700 proceeds to 704, which may include determining if soot production is greater than a threshold soot amount. The threshold soot amount may be based on a non-zero number. Soot production may be greater than the threshold soot amount during engine operating conditions where an air/fuel ratio is less than 1 (e.g., rich operation). During these engine operating conditions, hydrocarbons may be released from the engine at amounts higher than other amount of stoichiometric and lean engine operating conditions.

If the soot production is higher than the threshold soot amount, then the method 700 proceeds to 706 to activate a first exhaust gas treatment device. Activating the first exhaust gas treatment device may comprise providing a voltage to the first exhaust gas device, which may provide $O^{2-}$ ion movement from a cathode to an anode. Exhaust gas $NO_x$ touching the anode may react and oxidize to $NO_2$. As illustrated in FIG. 6, the first exhaust gas treatment device may be arranged upstream of a first emission control device. The first emission control device may comprise an oxidation catalyst configured to oxidize soot and other hydrocarbons released from the engine. This oxidation may be more favored in the presence of increased $NO_2$ concentrations. By activating the first emission control device, $NO_x$ in the exhaust gas may be converted to $NO_2$, which may further promote oxidation of hydrocarbons at the first emission control device.

If the soot production is not higher than the threshold soot amount, then the method 700 proceeds to 708, which may include determining if a $NO_x$ output of an engine is greater than a threshold $NO_x$ output. The threshold $NO_x$ output may be based on a non-zero value. The $NO_x$ output may be increased during an engine cold-start or during lean operation of the engine. If the $NO_x$ output is greater than the threshold $NO_x$ output, then the method 700 proceeds to 706 to activate the first exhaust gas treatment device as described above.

As described above with respect to FIG. 6, the first emission control device may further comprise a $NO_x$ adsorber, such as an LNT. The $NO_2$ generated by the first exhaust gas device may promote increased $NO_x$ adsorption onto the first emission control device. As such, $NO_x$ emissions may be trapped, wherein the $NO_x$ may be released during engine operating parameters when $NO_x$ emissions are lower, so that an SCR device, such as the third emission control device, may reduce the $NO_x$.

In this way, other embodiments of method 700 may include, additionally or alternatively, where the first exhaust gas treatment device is activated in response to the third emission control device not being configured to reduce $NO_x$. In one example, the third emission control device may not reduce $NO_x$ if it demands a reduction (e.g., ammonia) replenishment. If the demand may not be met, due to EGR flowing or a reductant reservoir being depleted of reductant, then the first exhaust gas treatment device may be activated, even if $NO_x$ output is less than the threshold $NO_x$ output, to increase $NO_x$ adsorption onto the first emission control device.

If the $NO_x$ output is not greater than the threshold $NO_x$ output, or if the third emission control device is receiving a reductant and configured to reduce $NO_x$, then the method 700 may proceed to 709, which includes not activating the first exhaust gas treatment device. As such, the concentration of $NO_2$ flowing to the first emission control device may be equal to an amount flowing out of the engine.

The method 700 proceeds to 710 to determine if a particulate filter load is greater than a threshold load. As described above, the second emission control device 71 of FIG. 6 may be a particulate filter (PF). The threshold load may be a non-zero value, wherein the threshold load may be based on a load of the PF where the PF may no longer store particulates. Additionally or alternatively, the threshold load may be based on an exhaust backpressure, wherein the exhaust backpressure may impact engine combustion by blocking exhaust gas expulsion from the engine. The PF load may be estimated based on an exhaust pressure sensor arranged upstream of the second emission control device. Additionally or alternatively, the PF load may be tracked over time via data stored in a multi-input look-up table, wherein the inputs include one or more of an exhaust gas temperature, particulate emissions from the engine, and regeneration durations.

If the PF load is greater than the threshold load, then the method 700 proceeds to 712, which may include activating the second exhaust gas treatment device. The second exhaust gas treatment device may be substantially identical to the first exhaust gas treatment device, and may be arranged between the first emission control device and the second emission control device. As such, the second exhaust gas treatment device may increase $NO_2$ of exhaust gas leaving the first emission control device and flowing to the second emission control device. The presence of $NO_2$ at higher concentrations may decrease an oxidation temperature of the particulate stored on the second emission control. In this way, an active regeneration of the second emission control device may occur by increasing $NO_2$ concentrations without increasing an exhaust gas temperature. By doing this, the active regeneration duration may be longer compared to a regeneration with elevated exhaust gas temperatures. For regenerations where the particulates are burned off the PF via elevated temperatures, the PF temperature may increase to a temperature where degradation to the PF may occur which may include leaks and/or cracks. Thus, the method 700 provides a method for regenerating the second emission control device with a reduced likelihood of degradation to the device and increased fuel economy.

If the PF load is not greater than the threshold load, then the method 700 proceeds to 713, which may include not activating the second exhaust gas treatment device. In this way, a $NO_2$ concentration of exhaust gas flowing to the second emission control device may be based on an output of the first emission control device.

The method 700 proceeds to 714, which may include determining if $NO_x$ is flowing to an SCR device. $NO_x$ may be flowing to the SCR device if $NO_x$ is still present in the exhaust gas downstream of the second emission control device (e.g., the PF). If $NO_x$ is flowing to the SCR, then the method 700 proceeds to 716 to activate the third exhaust gas treatment device. The third exhaust gas treatment device may be substantially identical to the first and second exhaust gas treatment devices. The third exhaust gas treatment device may increase a $NO_2$ concentration of exhaust gases leaving the second emission control device and flowing to the SCR device, which may be identical to the third emission control device 72 of FIG. 6. By increasing the $NO_2$ concentration, the third emission control device may reduce a greater amount of $NO_x$.

In one example, activating the third exhaust gas treatment device may further include adjusting a voltage applied to the third exhaust gas treatment device to generate a desired ratio of $NO_2:NO_x$. In one example, reduction of NO at the third emission control device may be more favored at the desired ratio. In one example, the desired ratio may be 0.5. The voltage applied may be adjusted in response to feedback from a $NO_x$ sensor arranged upstream of the third emission control device and downstream of the third exhaust gas aftertreatment device. In one example, if an injector is positioned to inject reductant into a portion of an exhaust passage upstream of the third emission control device, then the $NO_x$ sensor may be arranged between the third exhaust gas aftertreatment device and the injector. In this way, reductant (e.g., ammonia) from the injector may not be sensed by the $NO_x$ sensor, which would alter the $NO_x$ sensor analysis. In this way, the voltage applied may increase in the $NO_x$ sensor feedback indicates that $NO_x$ concentrations are too high in order to convert more $NO_x$ to $NO_2$.

If $NO_x$ is not flowing to the third emission control device, then the method 700 proceeds to 717, which includes not activating the third exhaust gas treatment device. As such, a concentration of $NO_2$ flowing to the third emission control device is based on an amount of $NO_2$ leaving the second emission control device.

The method 700 proceeds to 718, which include determining if ammonia is leaking from the SCR (e.g., the third emission control device). A $NO_x$ sensor may be arranged downstream of the third emission control device, wherein ammonia leaking may be sensed by the $NO_x$ sensor. If ammonia is leaking, then the method 700 proceeds to 720 to activate the fourth exhaust gas treatment device. The fourth exhaust gas treatment device may convert the leaking ammonia to $NO_2$, which is then expelled to an atmosphere through a tailpipe.

If ammonia is not leaking from the SCR, then the method 700 proceeds to 722, which may include not activating the fourth exhaust gas treatment device.

Turning now to FIG. 8, it shows a graph 800 illustrating a relationship between a voltage applied and a $NO_2:NO_x$ ratio. Plot 810 illustrates the $NO_2:NO_x$ ratio increasing as the voltage applied increases. In the example of FIG. 8, the relationship between the $NO_2:NO_x$ ratio and the voltage applied is linear. However, it will be appreciated that the relationship may be logarithmic or other without departing from the scope of the present disclosure. As such, the voltage applied to the electrochemical cell of an exhaust gas treatment device may be adjusted to adjust the $NO_2:NO_x$ ratio. In one example, increasing the voltage applied increases the presence of $NO_2$. Thus, decreasing the voltage applied may decrease the presence of $NO_2$.

In this way, an exhaust passage may comprise one or more emission control devices chemically configured to reduce, oxidize, and/or store exhaust gas constituents. An exhaust gas treatment device may be arranged upstream of each of the emission control devices, wherein the exhaust gas treatment device is configured to increase a concentration of $NO_2$ present in an exhaust gas flow. The technical effect of increasing the $NO_2$ concentration is to increase a reactivity of a downstream emission control device, which may decrease total emissions to an environment.

In another representation, an exhaust gas treatment device comprises an electrochemical cell having a first electrode, a second electrode, and an electrolyte provided between the first and second electrodes, wherein the electrochemical cell is configured to convert nitric oxide within the exhaust gas to nitrogen dioxide, such that a concentration of the nitrogen dioxide within the exhaust gases leaving the exhaust gas treatment device is increased relative to the exhaust gases entering the exhaust treatment device, wherein the first and second electrodes of the electrochemical cell are arranged, such that the exhaust gases are in contact with the first and second electrodes. A first example of the exhaust gas treatment device comprises where first and second electrodes are arranged such that the concentration of the nitrogen dioxide at the second electrode is lower than the concentration of the nitrogen dioxide leaving the first electrode. A second example of the exhaust gas treatment device, optionally including the first example, further includes a duct having an inlet and an outlet for exhaust gases, and wherein the first and second electrodes of the electrochemical cell are arranged within the duct. A third example of the exhaust gas treatment device, optionally including one or more of the first and second examples, further includes a duct having an inlet and an outlet for exhaust gases, and wherein the first electrode of the electrochemical cell is arranged within the duct and the second electrode of the electrochemical cell is arranged at least partially outside of the duct. A fourth example of the exhaust gas treatment device, optionally including one or more of the first through third examples, further includes where the device comprises a catalyst coating applied to the first electrode. A fifth example of the exhaust gas treatment device, optionally including one or more of the first through fourth examples, further includes where the electrolyte is configured to conduct oxygen-ions through the electrolyte. A sixth example of the exhaust gas treatment device, optionally including one or more of the first through fifth examples, further includes where the first and second electrodes and the electrolyte are provided on a surface of a mesh or gauze arranged within the flow of exhaust gases. A seventh example of the exhaust gas treatment device, optionally including one or more of the first through sixth examples, further includes a voltage source electrically connected to the electrochemical cell, wherein the voltage source is adjustable such that the voltage supplied to the electrochemical cell can be adjusted to affect the rate of conversion of the nitric oxide to the nitrogen dioxide. An eighth example of the exhaust gas treatment device, optionally including one or more of the first through seventh examples, further includes a current meter and a controller configured to determine an operating condition of the device based on a current measured by the current meter. A ninth example of the exhaust gas treatment device, optionally including one or more of the first through eighth examples, further includes where at least one of the exhaust gas treatment devices is provided in an exhaust gas recirculation duct configured to recirculate a portion of exhaust gases flowing within the exhaust duct to an engine inlet. A tenth example of the exhaust gas treatment device, optionally including one or more of the first through ninth examples, further includes where a further exhaust gas treatment device provided downstream of at least one of the exhaust gas treatment devices, wherein the rate of reduction of the concentration of a constituent or group of constituents within the exhaust gases by the further exhaust gas treatment device varies according to the concentration of nitrogen dioxide within the exhaust gases. An eleventh example of the exhaust gas treatment device, optionally including one or more of the first through tenth examples, further includes supplying a voltage across an electrochemical cell of an exhaust gas treatment device arranged at least partially within a flow of exhaust gases, so that nitric oxide within the exhaust gas is converted to nitrogen dioxide, such that a concentration of the nitrogen dioxide within the exhaust gases is increased, wherein the electrochemical cell comprises a first electrode, a second electrode and an electrolyte provided between the first and second electrodes, wherein the first and second electrodes of the electrochemical cell are arranged, such that the exhaust gases are in contact with the first and second electrodes and providing a flow of exhaust gases having an increased concentration of the nitrogen dioxide to a further exhaust gas treatment device arranged downstream of the electrochemical cell. A twelfth example of the exhaust gas treatment device, optionally including one or more of the first through eleventh examples, further includes adjusting the voltage supplied across the electrochemical cell such that the concentration of the nitrogen dioxide is increased to a desired concentration. A thirteenth example of the exhaust gas treatment device, optionally including one or more of the first through twelfth examples, further includes determining a current flowing though the electrochemical cell and determining an operating condition of the electrochemical cell based on the current.

An example of an exhaust system comprising an exhaust passage comprising a first exhaust gas treatment device upstream of a first emission control device, further comprising a second exhaust gas treatment device downstream of the first emission control device and upstream of a second emission control device, and where the first and second exhaust gas treatment devices are configured to increase a concentration of $NO_2$. A first example of the exhaust system further includes where the first exhaust gas treatment device is identical to the second exhaust gas treatment device, and where each of the first and second exhaust gas treatment devices comprises an electrochemical cell comprising a cathode and an anode, and where oxygen ions flow from the cathode to the anode. A second example of the exhaust system, optionally including the first example, further includes where the anode is arranged in the exhaust passage and the cathode is arranged outside of the exhaust passage. A third example of the exhaust system, optionally including the first and/or second examples, further includes where the cathode and the anode are arranged in the exhaust passage, and where the anode is upstream of the cathode relative to a direction of exhaust gas flow, and where a wall is arranged between the cathode and the anode, the wall shaped to direct exhaust gas to flow around and away from the cathode. A fourth example of the exhaust system, optionally including one or more of the first through third examples, further includes where the anode increases the concentration of $NO_2$ when NO in the exhaust gas contacts the anode. A fifth example of the exhaust system, optionally including one or more of the first through fourth examples, further includes where the first emission control device is an oxidation catalyst, a lean $NO_x$ trap, or both. A sixth example of the exhaust system, optionally including one or more of the first through fifth examples, further includes where the second emission control device is one of a particulate filter or a selective catalytic reduction device. A seventh example of the exhaust system, optionally including one or more of the first through sixth examples, further includes where a third exhaust gas treatment device downstream of the second emission control device and upstream of a third emission control device, and where the first emission control device is a combination of an oxidation catalyst upstream of a lean $NO_x$ trap, the second emission control device is a particulate filter, and the third emission control device is a selective catalytic reduction device.

An embodiment of a system comprises an exhaust passage shaped to receive exhaust gases from an engine, a plurality of exhaust gas treatment devices arranged in the exhaust passage, an exhaust gas treatment device of the plurality of exhaust gas treatment devices comprising an electrochemical cell comprising a cathode and an anode, and where oxygen ions flow from the cathode to the anode, a first emission control device comprising an oxidation catalyst upstream of a $NO_x$ adsorber, wherein the first emission control device is downstream of a first exhaust gas treatment device of the plurality of exhaust gas treatment devices, a second emission control device comprising a particulate filter, where the second emission control device is downstream of a second exhaust gas treatment device of the plurality of exhaust gas treatment devices, and where the second exhaust gas treatment device is downstream of the first emission control device, a third emission control device comprising a selective catalytic reduction device, where the third emission control device is downstream of a third exhaust gas treatment device of the plurality of exhaust gas treatment devices, and where the third exhaust gas treatment device is downstream of the second emission control device, and a controller with computer-readable instructions stored thereon that when executed enable the controller to activate one or more of the first exhaust gas treatment device, the second exhaust gas treatment device, and the third exhaust gas treatment device by applying a voltage to the electrochemical cell to increase a concentration of $NO_2$. A first example of the system further includes where the instructions further enable the controller to activate the first exhaust gas treatment device in response to one or more of soot being oxidized at the oxidation catalyst and $NO_x$ being captured at the $NO_x$ adsorber. A second example of the system, optionally including the first example, further includes where the instructions further enable the controller to activate the second exhaust gas treatment device in response to a particulate filter load being greater than a threshold load. A third example of the system, optionally including the first and/or second examples, further includes where the instructions further enable the controller to activate the third exhaust gas treatment device in response to the third emission control device reducing $NO_x$. A fourth example of the system, optionally including one or more of the first through third examples, further includes where the instructions further enable the controller to adjust the voltage to the third exhaust gas treatment device in response to a $NO_2:NO_x$ ratio upstream of the third emission control device, and where the voltage is adjusted to adjust the $NO_2:NO_x$ ratio to 0.5. A fifth example of the system, optionally including one or more of the first through fourth examples, further includes where a fourth exhaust gas treatment device of the plurality of exhaust gas treatment devices arranged downstream of the third emission control device. A sixth example of the system, optionally including one or more of the first through fifth examples, further includes where the instructions further enable the controller to activate the fourth exhaust gas treatment device in response to ammonia leaking from the third emission control device.

An embodiment of a method comprises activating a first exhaust gas treatment device upstream of a first emission control device in response to one or more of a soot level being greater than a threshold soot level and an engine NO output being greater than a threshold engine $NO_x$ output, activating a second exhaust gas treatment device upstream of a second emission control device and downstream of the first emission control device in response to the second emission control device requesting a regeneration, activating a third exhaust gas treatment device upstream of a third emission control device and downstream of the second emission control device in response to the third emission control device reducing $NO_x$, and activating a fourth exhaust gas treatment device downstream of the third emission control device in response to ammonia leaking through the third emission control device, wherein activating the first, second, third, and fourth exhaust gas treatment devices comprises applying a voltage to an electrochemical cell arranged between a cathode and an anode of each of the first, second, third, and fourth exhaust gas treatment devices. A first example of the method further includes where flowing exhaust gas through an exhaust gas passage along which the first, second, third, and fourth exhaust gas treatment devices are arranged, and where NO in the exhaust gas is converted to $NO_2$ when contacting the anode of an activated exhaust gas treatment device of the first, second, third, and fourth exhaust gas treatment devices. A second example of the method, optionally including the first example, further includes where the activating the third exhaust gas treatment device further comprises adjusting the voltage applied to the electrochemical cell of the third exhaust gas treatment device in response to a ratio of $NO_2:NO_x$. A third example of the method, optionally including the first and/or second examples, further includes where the regeneration is an activate regeneration, and where the active regeneration is executed without adjusting an exhaust gas temperature. A fourth example of the method, optionally including one or more of the first through third examples, further includes where applying the voltage further comprises increasing the voltage to increase a concentration of $NO_2$.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system comprising:
an exhaust passage comprising a first exhaust gas treatment device upstream of a first emission control device, further comprising a second exhaust gas treatment device downstream of the first emission control device and upstream of a second emission control device, where the first and second exhaust gas treatment devices are configured to increase a concentration of $NO_2$.

2. The exhaust system of claim 1, wherein the first exhaust gas treatment device is identical to the second exhaust gas treatment device, and where each of the first and second exhaust gas treatment devices comprises an electrochemical cell comprising a cathode and an anode, and where oxygen ions flow from the cathode to the anode.

3. The exhaust system of claim 2, wherein the anode is arranged in the exhaust passage and the cathode is arranged outside of the exhaust passage.

4. The exhaust system of claim 2, wherein the cathode and the anode are arranged in the exhaust passage, and where the anode is upstream of the cathode relative to a direction of exhaust gas flow, and where a wall is arranged between the cathode and the anode, the wall shaped to direct exhaust gas to flow around and away from the cathode.

5. The exhaust system of claim 2, wherein the anode increases the concentration of $NO_2$ when NO in the exhaust gas contacts the anode.

6. The exhaust system of claim 1, wherein the first emission control device is an oxidation catalyst, a lean $NO_x$ trap, or both.

7. The exhaust system of claim 1, wherein the second emission control device is one of a particulate filter or a selective catalytic reduction device.

8. The exhaust system of claim 1, further comprising a third exhaust gas treatment device downstream of the second emission control device and upstream of a third emission control device, and where the first emission control device is a combination of an oxidation catalyst upstream of a lean $NO_x$ trap, the second emission control device is a particulate filter, and the third emission control device is a selective catalytic reduction device.

9. A system comprising:
an exhaust passage shaped to receive exhaust gases from an engine;
a plurality of exhaust gas treatment devices arranged in the exhaust passage, an exhaust gas treatment device of the plurality of exhaust gas treatment devices comprising an electrochemical cell comprising a cathode and an anode, and where oxygen ions flow from the cathode to the anode;
a first emission control device comprising an oxidation catalyst upstream of a $NO_x$ adsorber, wherein the first emission control device is downstream of a first exhaust gas treatment device of the plurality of exhaust gas treatment devices;
a second emission control device comprising a particulate filter, where the second emission control device is downstream of a second exhaust gas treatment device of the plurality of exhaust gas treatment devices, and where the second exhaust gas treatment device is downstream of the first emission control device;
a third emission control device comprising a selective catalytic reduction device, where the third emission control device is downstream of a third exhaust gas treatment device of the plurality of exhaust gas treatment devices, and where the third exhaust gas treatment device is downstream of the second emission control device; and
a controller with computer-readable instructions stored thereon that when executed enable the controller to:
activate one or more of the first exhaust gas treatment device, the second exhaust gas treatment device, and the third exhaust gas treatment device by applying a voltage to the electrochemical cell to increase a concentration of $NO_2$.

10. The system of claim 9, wherein the instructions further enable the controller to activate the first exhaust gas treatment device in response to one or more of soot being oxidized at the oxidation catalyst and $NO_x$ being captured at the $NO_x$ adsorber.

11. The system of claim 9, wherein the instructions further enable the controller to activate the second exhaust gas treatment device in response to a particulate filter load being greater than a threshold load.

12. The system of claim 9, wherein the instructions further enable the controller to activate the third exhaust gas treatment device in response to the third emission control device reducing $NO_x$.

13. The system of claim 12, wherein the instructions further enable the controller to adjust the voltage to the third exhaust gas treatment device in response to a $NO_2:NO_x$ ratio upstream of the third emission control device, and where the voltage is adjusted to adjust the $NO_2:NO_x$ ratio to 0.5.

14. The system of claim 9, further comprising a fourth exhaust gas treatment device of the plurality of exhaust gas treatment devices arranged downstream of the third emission control device.

15. The system of claim 14, wherein the instructions further enable the controller to activate the fourth exhaust gas treatment device in response to ammonia leaking from the third emission control device.

16. A method comprising:
activating a first exhaust gas treatment device upstream of a first emission control device in response to one or more of a soot level being greater than a threshold soot level and an engine $NO_x$ output being greater than a threshold engine $NO_x$ output;
activating a second exhaust gas treatment device upstream of a second emission control device and downstream of the first emission control device in response to the second emission control device requesting a regeneration;
activating a third exhaust gas treatment device upstream of a third emission control device and downstream of the second emission control device in response to the third emission control device reducing $NO_x$; and
activating a fourth exhaust gas treatment device downstream of the third emission control device in response to ammonia leaking through the third emission control device; wherein
activating the first, second, third, and fourth exhaust gas treatment devices comprises applying a voltage to an electrochemical cell arranged between a cathode and an anode of each of the first, second, third, and fourth exhaust gas treatment devices.

17. The method of claim 16, further comprising flowing exhaust gas through an exhaust gas passage along which the first, second, third, and fourth exhaust gas treatment devices are arranged, and where NO in the exhaust gas is converted to $NO_2$ when contacting the anode of an activated exhaust gas treatment device of the first, second, third, and fourth exhaust gas treatment devices.

18. The method of claim 16, wherein the activating the third exhaust gas treatment device further comprises adjusting the voltage applied to the electrochemical cell of the third exhaust gas treatment device in response to a ratio of $NO_2:NO_x$.

19. The method of claim 16, wherein the regeneration is an activate regeneration, and where the active regeneration is executed without adjusting an exhaust gas temperature.

20. The method of claim 16, wherein applying the voltage further comprises increasing the voltage to increase a concentration of $NO_2$.

* * * * *